United States Patent
Lewis et al.

(10) Patent No.: US 7,523,396 B2
(45) Date of Patent: Apr. 21, 2009

(54) SURFACE CONSTRUCTION AUDIT TRAIL AND MANIPULATION

(75) Inventors: John M. Lewis, Acton, MA (US); Robert Bruce Todd, Jr., New Boston, NH (US); Edward James Connor, Manchester, NH (US); Christopher Eric Putnam, Henniker, NH (US)

(73) Assignee: Autodesk, Inc., San Rafael, CA (US)

( * ) Notice: Subject to any disclaimer, the term of this patent is extended or adjusted under 35 U.S.C. 154(b) by 495 days.

(21) Appl. No.: 10/953,245

(22) Filed: Sep. 29, 2004

(65) Prior Publication Data

US 2005/0068315 A1   Mar. 31, 2005

Related U.S. Application Data

(60) Provisional application No. 60/507,062, filed on Sep. 29, 2003, provisional application No. 60/507,080, filed on Sep. 29, 2003, provisional application No. 60/506,975, filed on Sep. 29, 2003, provisional application No. 60/506,974, filed on Sep. 29, 2003.

(51) Int. Cl.
  *G06F 3/00* (2006.01)
  *G06F 3/048* (2006.01)
  *G06F 19/00* (2006.01)

(52) U.S. Cl. .................. 715/700; 715/845; 715/964; 700/182

(58) Field of Classification Search ......... 715/530–531, 715/511, 840–841, 229, 255, 700, 845, 964; 345/594, 610, 619; 717/110–113; 700/182
See application file for complete search history.

(56) References Cited

U.S. PATENT DOCUMENTS

| 5,329,464 A | 7/1994 | Sumic et al. |
| 5,357,428 A | 10/1994 | Stone, Jr. |
| 5,467,444 A | 11/1995 | Kawamura et al. |
| 5,553,211 A | 9/1996 | Uotani |
| 5,555,354 A | 9/1996 | Strasnick et al. |
| 5,745,751 A | 4/1998 | Nelson et al. |
| 5,838,634 A | 11/1998 | Jones et al. |

(Continued)

OTHER PUBLICATIONS

Giordan et al. "Using Adobe Photoshop 5", Jul. 1998, published by Que, copyright 1998, pp. 128, 130-131, 346-351, 361.*

(Continued)

*Primary Examiner*—Kieu D Vu
*Assistant Examiner*—Andrew Tank
(74) *Attorney, Agent, or Firm*—Gates & Cooper LLP (57) ABSTRACT

A method, apparatus, and article of manufacture provide the ability to manipulate a drawing surface in a CAD/GIS computer application. A drawing surface is displayed in a CAD/GIS application followed by the performance of a surface edit operation on the drawing surface. The surface edit operation is stored/saved as an atomic property in a list of surface edit operations. The list of surface edit operations is displayed in a graphical user interface (GUI). Each surface edit operation may be independently toggled on/off in the GUI and such toggling is reflected in the CAD/GIS application by displaying an effect of executing the surface edit operation if toggled on and displaying the drawing surface without execution of the surface edit operation if toggled off.

23 Claims, 5 Drawing Sheets

U.S. PATENT DOCUMENTS

| | | | |
|---|---|---|---|
| 6,108,668 A * | 8/2000 | Bates et al. | 707/203 |
| 6,185,591 B1 * | 2/2001 | Baker et al. | 715/531 |
| 6,259,451 B1 | 7/2001 | Tesler | |
| 6,523,134 B2 * | 2/2003 | Korenshtein | 714/16 |
| 6,527,812 B1 * | 3/2003 | Bradstreet | 715/210 |
| 6,654,690 B2 | 11/2003 | Rahmes et al. | |
| 6,721,694 B1 | 4/2004 | Lambrecht et al. | |
| 6,732,120 B1 | 5/2004 | Du | |
| 6,748,327 B1 | 6/2004 | Watson | |
| 6,784,896 B1 | 8/2004 | Perani et al. | |
| 6,907,364 B2 | 6/2005 | Poolla et al. | |
| 6,912,692 B1 * | 6/2005 | Pappas | 715/762 |
| 6,915,211 B2 | 7/2005 | Kram et al. | |
| 6,937,960 B2 | 8/2005 | Khanna et al. | |
| 6,965,945 B2 | 11/2005 | Lin et al. | |
| 7,002,573 B2 | 2/2006 | Trotta et al. | |
| 7,054,741 B2 | 5/2006 | Harrison et al. | |
| 7,123,258 B2 | 10/2006 | Deny et al. | |
| 7,164,883 B2 | 1/2007 | Rappaport et al. | |
| 7,272,815 B1 * | 9/2007 | Eldridge et al. | 717/101 |
| 7,280,109 B2 | 10/2007 | Hoppe | |
| 7,283,134 B2 | 10/2007 | Hoppe | |
| 2001/0004726 A1 | 6/2001 | Lambrecht | |
| 2001/0013866 A1 | 8/2001 | Migdal et al. | |
| 2001/0049704 A1 * | 12/2001 | Hamburg et al. | 707/530 |
| 2002/0019728 A1 | 2/2002 | Van Bemmel et al. | |
| 2002/0042702 A1 | 4/2002 | Calvert et al. | |
| 2002/0085748 A1 | 7/2002 | Baumberg | |
| 2002/0161469 A1 | 10/2002 | Faulkner et al. | |
| 2003/0046099 A1 | 3/2003 | Lamont et al. | |
| 2003/0112235 A1 | 6/2003 | Grace | |
| 2003/0158668 A1 | 8/2003 | Anderson | |
| 2003/0216949 A1 | 11/2003 | Kram et al. | |
| 2003/0218609 A1 | 11/2003 | Maillot et al. | |
| 2004/0004611 A1 | 1/2004 | Komornicki et al. | |
| 2004/0070586 A1 | 4/2004 | Taubin | |
| 2004/0075659 A1 | 4/2004 | Taubin | |
| 2004/0076279 A1 | 4/2004 | Taschereau | |
| 2004/0090438 A1 | 5/2004 | Alliez et al. | |
| 2004/0140991 A1 * | 7/2004 | Trotta et al. | 345/700 |
| 2004/0215428 A1 | 10/2004 | Bras et al. | |
| 2004/0249654 A1 | 12/2004 | Sohl, III et al. | |
| 2005/0013467 A1 | 1/2005 | McNitt | |
| 2005/0034075 A1 | 2/2005 | Riegelman et al. | |
| 2005/0068315 A1 | 3/2005 | Lewis et al. | |
| 2005/0104884 A1 | 5/2005 | Iwata et al. | |
| 2005/0209895 A1 | 9/2005 | Coleou | |
| 2006/0235620 A1 | 10/2006 | Lecerf | |
| 2007/0021951 A1 | 1/2007 | Lee Seislink | |
| 2007/0219765 A1 | 9/2007 | Calvert et al. | |

OTHER PUBLICATIONS

Blatner et al. "Essential Photoshop 6 Tips", Aug. 13, 2001, via AdobePress www.adobepress.com/articles/printerfriendly.asp?p=22789, article courtesy of PeachPit Press.*

Owen et al., "A Comprehensive Modeling Environment for the Simulation of Groundwater Flow and Transport", Engineering with Computers, vol. 12, Nos. 3-4, Sep. 1996, copyright 1996 Springer-Verlag London Limited, pp. 235-242.*

Berlage, "A Selective Mechanism for Graphical User Interfaces Based on Command Objects", ACM Transactions on Computer-Human Interaction, vol. 1, No. 3, copyright 1994 ACM, pp. 269-294.*

Meng et al., "Visualizing Histories for Selective Undo and Redo", Proceedings from the Third Asian Pacific Computer and Human Interaction, published by IEEE Computer Society, 1998.*

ESRI White Paper: "Working with Geodatabase: Powerful Multiuser Editing and Sophisticated Data Integrity", Feb. 2002, copyright 2002 ESRI.*

ESRI White Paper: "GIS and CAD—The Right Tool for the Job", Jun. 2002, copyright 2002 ESRI.*

Schoenstein, "AutoCAD Land Development Desktop Release 2i", Proceedings of Digital Earth Moving: First International Symposium, DEM 2001, copyright Springer-Verlag Berlin Heidelberg 2001, pp. 39-42.*

Gold, "Applications of dynamic voronoi data structures. In Oral Presentation," Second European Conference on Geographic Information Systems, Brussels, Belgium 1991, http://www.voronoi.com/pdfs/1990-1994/application_of_dynamic_data_structures.pdf. Printed May 28, 2007.

Schneider et al., "GPU-friendly high-quality terrain rendering," Journal of the WSCG, vol. 14, 2006, http://wwwcg.in.tum.de/Research/data/Publications/wscg06.pdf.

Fowler et al., "Automatic extraction of irregular network digital terrain models," In Proc. ACM SIGGraph '79, pp. 199-207, 1979.

Lindstrom et al, "Visualization of large terrains made easy," In Proc. IEEE Visualization '01, pp. 363-370, 2001.

Lindstrom et al., "Terrain simplification simplified: A general framework for view-dependent out-of-core visualization," IEEE Transactions on Visualization and Computer Graphics, 8(3):239-254, 2002.

Koller et al., "Virtual GIS: A real-time 3D geographic information system," In Proc. IEEE Visualization 95, pp. 94-100, 1995.

Suter et al., "Automated generation of visual simulation databases using remote sensing and GIS," In IEEE Visualization '95, pp. 86-93, 1995.

The Voronoi Web Site 1990-1995. http://www.voronoi.com/pubs_1990.htm. Printed on May 28, 2007.

Schoenstein, AutoCAD Land Development Desktop Release 2i, Springer Berlin / Heidelberg, 2001, vol. 2181/2001, pp. 39-42.

Eastman, J. "IDRISI Kilimanjaro Guide to GIS and Image Processing," Apr. 2003, pp. 1-8 and 261-282.

Johnston, K. et al., "ArcGIS 9 Using ArcGIS Geostatistical Analyst," 2003, ESRI; pp. 1-300.

Van Kreveld, M., "Chapter 3. Digital Elevation Models and TIN Algorithms," 1997, Algorithmic Foundations of Geographic Information Systems, vol. 1340/1997, pp. 37-78.

Oliver, M. et al., "Kriging: A Method of Interpolation for Geographical Information Systems," 1990, International Journal of Geographical Information Science, vol. 4, issue 3, pp. 313-332.

Watson, G. et al., "Smoothing and Interpolation by Kriging and with Splines," 1984, Mathematical Geology, vol. 16, No. 6, pp. 601-615.

* cited by examiner

| Build | |
|---|---|
| Convert proximity breaklines | Yes |
| Exclude elevations less than | No |
| Elevation | |
| Exclude elevations greater than | No |
| Elevation | |
| Use maximum triangle length | No |
| Maximum triangle length | |
| Allow crossing breaklines | Yes |
| Elevation to use | Use first breakline elevation at intersection |
| Copy deleted drawing object data to definition | Yes |

FIG. 3

| Data operations | |
|---|---|
| Use boundaries | Yes |
| Use breaklines | Yes |
| Use contour data | Yes |
| Use DEM files | Yes |
| Use point files | Yes |
| Use point groups | Yes |
| Use drawing object points | Yes |

FIG. 4

| Edit operations | |
|---|---|
| Use add point | Yes |
| Use delete point | Yes |
| Use modify point | Yes |
| Use add line | Yes |
| Use delete line | Yes |
| Use swap edge | Yes |
| Use minimize flat faces | Yes |
| Use smooth surface | Yes |
| Use paste surface | Yes |
| Use raise/lower surface | Yes |
| Use import LandXML | Yes |
| Use import TIN | Yes |
| Use move point | Yes |

FIG. 5

| Definition Type | Parameters |
|---|---|
| ☑ Add point file | <Path and file name> |
| ☑ Import TIN (or LandXML) | <Path and file name> |
| ☑ Add point group | <Point group name> |
| ☑ Add DEM file | <Path and file name> |
| ☑ Add contour data | <Elevation range?> |
| ☑ Add breakline | <Breakline type and description?> |
| ☑ Add boundary | <Boundary type and description> |
| ☑ Add point | <X,Y,Z coordinates> |
| ☑ Delete point | <X,Y coordinates> |
| ☑ Modify point | <X,Y,Z coordinates> |
| ☑ Add line | <Start X,Y coordinates>, <End X,Y coordinates> |

SURFACE CONSTRUCTION AUDIT TRAIL AND MANIPULATION

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/507,062, filed Sep. 29, 2003, by Christopher Eric Putnam and Mark W. Anderson, entitled "PARCEL DESIGN AND PLANAR TOPOLOGY;"

Provisional Application Ser. No. 60/507,080, filed Sep. 29, 2003, by Sreenadha B. Godavarthy, John M. Lewis, Thomas M Inzinga, Edward James Connor, Robert Bruce Todd, Jr., and Christopher Eric Putnam, entitled "SURFACE PROCESSING;"

Provisional Application Ser. No. 60/506,975, filed Sep. 29, 2003, by Kumud Dev Vaidya, Michael C. Rogerson, and Bhamadipati S. Rao, entitled "HORIZONTAL ALIGNMENT PROCESSING;"and Provisional Application Ser. No. 60/506,974, filed Sep. 29, 2003, by Kumud Dev Vaidya, Michael C. Rogerson, and Bhamadipati S. Rao, entitled "VERTICAL ALIGNMENT PROCESSING."

This application is related to the following co-pending and commonly-assigned patent application, which application is incorporated by reference herein:

U.S. patent application Ser. No. 10/954,526, filed on the same date herewith, by Christopher Eric Putnam and Mark W. Anderson, entitled "A METHOD FOR DYNAMICALLY UPDATING A PLANAR TOPOLOGY";

U.S. patent application Ser. No. 10/954,542, filed on the same date herewith, by Christopher Eric Putnam and Mark W. Anderson, entitled "A METHOD FOR AUTOMATICALLY DISCOVERING HIERARCHICAL RELATIONSHIPS IN PLANAR TOPLOGIES";

U.S. patent application Ser. No. 10/954,529, filed on the same date herewith, by Christopher Eric Putnam and Mark W. Anderson, entitled "INTERACTIVE METHOD FOR DESIGNING PARCELS";

U.S. patent application Ser. No. 10/953,806, filed on the same date herewith, by Sreenadha B. Godavarthy and John M. Lewis, entitled "SURFACE SMOOTHING TECHNIQUES";

U.S. patent application Ser. No. 10/953,934, filed on the same date herewith, by John M. Lewis, Thomas M. Inzinga and Edward James Connor, entitled "INTERACTIVE TRAINGULATED IRREGULAR NETWORK (TIN) SURFACES DESIGN";

U.S. patent application Ser. No. 10/953,807, filed on the same date herewith, by Kumud Dev Vaidya, Michael C. Rogerson, and Bhamadipati S. Rao, entitled "INTERACTIVE CONSTRAINT BASED ALIGNMENT DESIGN".

BACKGROUND OF THE INVENTION

1. Field of the Invention.

The present invention relates generally to computer aided design (CAD) applications and geographic information systems (GIS), and in particular, to a method, apparatus, and article of manufacture for managing sequential operations involved in surface design and manipulation.

2. Description of the Related Art

Computer aided design (CAD) applications are traditionally used for creating and editing drawings (e.g., maps, floor plans, and engineering designs). Further, CAD applications enable users to create/modify highly precise and accurate drawings/maps. Civil engineers and surveyors, for whom precision and accuracy are of primary importance, have adopted CAD applications to speed data input and perform computations for design projects.

Geographic information systems (GIS) have been traditionally used for spatial analysis and mapping and allow users to store, retrieve, manipulate, analyze, and display geographically referenced data. In this regard, an arc/node data model is commonly used in the GIS industry to identify a polygon that is used in land analysis. The arc/node model enables efficient data storage and users to easily determine whether an object is inside or outside a polygon. However, traditional GIS have been aimed at general cartography and broad land-use analysis, and not precision design for the construction and management of real-world projects. In this regard, the geometric precision that many engineers require has not been provided by traditional GIS systems. Some GIS companies have attempted to use complex databases to model real-world objects. However, such databases are still built on points, lines, and polygons and cannot store geometric objects used in traditional CAD applications (e.g., true arcs or road spirals).

Many organizations have used both CAD and GIS tools in different departments to utilize the different specific features available. Further, data from original CAD drawings may be frequently imported or digitized for use in the GIS mapping environment. However, because of the limitations of GIS systems and/or CAD systems, during such a transition, data connectivity, accuracy, and geometric precision are often lost. Accordingly, what is needed is an integrated solution that provides the functionality and tools of a GIS system with the precision and accuracy of a CAD application.

In an attempt to address the above concerns, industry specific components were built on top of the CAD engine to address specialized needs and eventually, an integrated solution was developed (e.g., Autodesk Map™ or Autodesk Land Desktop™ software available from the assignee of the present invention). Integrated solutions attempt to provide GIS functionality (e.g., multiuser editing, polygon overlay and analysis, topology, thematic mapping, etc.) within a CAD application and spatial database. The integrated solution allows civil engineers the ability to integrate the precision engineering tasks (from CAD) (e.g., site, roadway, and hydrological design) with the spatial analysis tools and data management of GIS.

Some integrated solutions may provide solutions for a particular industry or field. For example, one such integrated solution may be tailored to land development professionals to provide a base level of functionality for land planners, surveyors, civil engineers, drafters, and anyone who creates supporting documents. Such an application may also provide a streamlined ability to communicate survey data to and from the field and/or provide transportation and site engineering tools, and hydrology and hydraulics design and analysis.

Drawings in an integrated solution are often associated with one or more projects and a single project can contain one or more drawings. In this regard, land development professionals may desire to generate a model of the earth's surface for a project. Such a surface model is a three-dimensional geometric representation of the surface of an area of land. Surface models may be made up of triangles that are created when points that make up the surface data are connected. The triangles may form a triangulated irregular network (TIN) surface. A TIN line is one of the lines that makes up the surface triangulation. To create TIN lines, the surface points that are closest together may be connected.

The surface data used to obtain the surface points (i.e., for the surface map) may comprise random point data (points taken at a variety of elevations and coordinates), a selected group of points, coordinate geometry (COGO) points (e.g., COGO point data stored in an external database 110), or points imported from a file. Alternatively, coordinates from blocks or lines at elevations in a drawing may be used.

In addition to points, surfaces may also be built from DEM files (Digital Elevation Models), contour, breakline, and boundary data. The vertices of a contour may be used as surface points, or the contours may be treated as breaklines that prevent triangulation lines from crossing the contours.

To build a surface accurately, more information than points and contours must be provided. For example, to prevent surface triangulation across features such as roads or stream, breaklines may be defined. Breaklines are constraint lines used by the model that represent abrupt changes in the surface. TIN lines may be drawn to and from breakline vertices, but they do not cross the breakline. By including boundaries in the surface definition, a user can control how the surface extends to its outer limits, and internal areas may be hidden to prevent triangulation from occurring.

In addition to the above, when editing/manipulating a surface, many operations may be conducted by a user. However, the prior art does not provide the ability to easily undo and/or change a previously conducted operation. Further, the user does not have the option to compare the effects that a single operation may have on a surface. Accordingly, what is needed, is a GIS/CAD system that enables a user to edit a surface while maintaining the ability to view and manipulate edit operations on an individual basis.

SUMMARY OF THE INVENTION

One or more embodiments of the invention provide a technique for managing the sequential operations involved in surface design and manipulation. The data additions and edits are remembered as a list of atomic operations. The user can browse the surface's operation list and toggle steps on/off, or remove an operation. This provides the ability to play back the surface to a previous (original) state, or back to its current state. The user can compare the effects that individual operations may have on the surface by toggling them on/off in the surface operation list.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
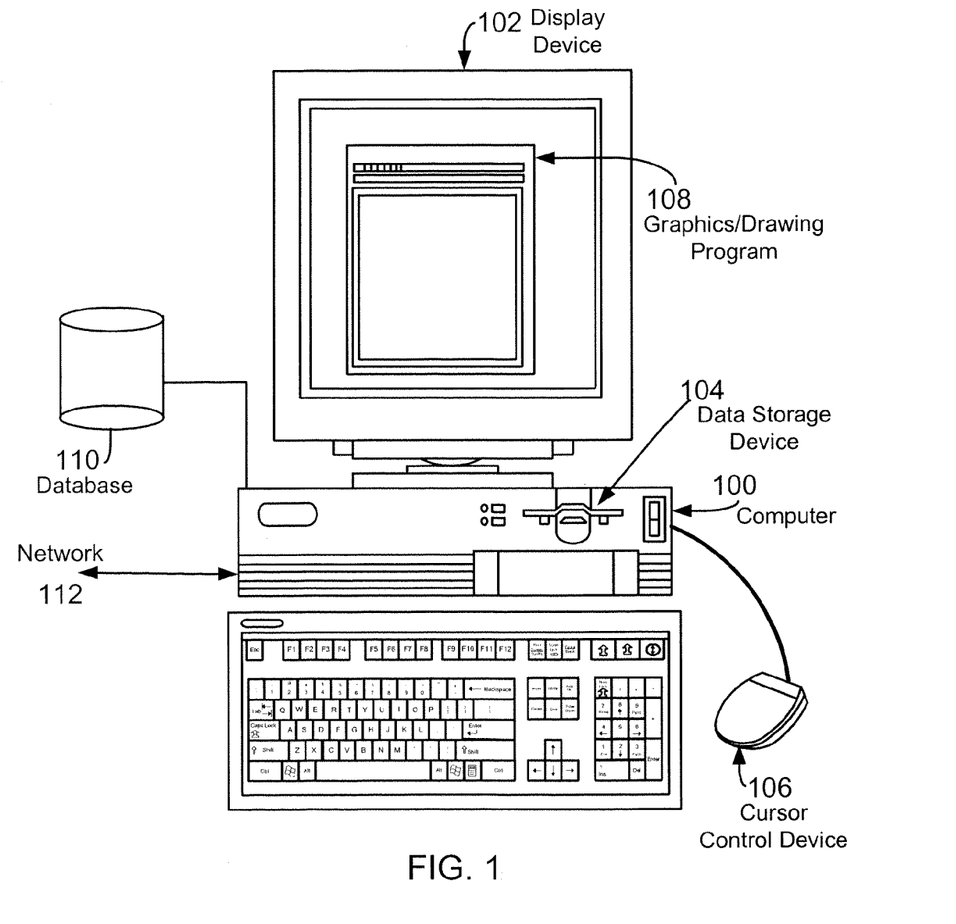
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108 (e.g., a CAD program), wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc. Further, the graphics/drawing program 108 may utilize a database 110 such as a spatial database.

Computer 100 may also be connected to other computers 100 (e.g., a client or server computer) via network 112 comprising the Internet, LANs (local area network), WANs (wide area network), or the like. Further, database 110 may be integrated within computer 100 or may be located across network 112 on another computer 100 or accessible device.

Those skilled in the art will recognize that the exemplary environment illustrated in FIG. 1 is not intended to limit the present invention. Indeed, those skilled in the art will recognize that other alternative environments may be used without departing from the scope of the present invention. Accordingly, FIG. 1 illustrates an integrated CAD and GIS system that combines the traditional capabilities of CAD and GIS tools with common spatial management features. In this regard, such an integrated solution enables the use of true geometry, precision, powerful creation and editing tools, and drawing and document production of a CAD system in addition to the GIS capabilities for polygons, topology, overlay analysis, seamless database use, and thematic mapping. Further, single or multiple users may integrate their workflow using such a system.

Software Embodiments

As described above, one or more embodiments of the invention is implemented in an integrated CAD/GIS system. The invention provides a technique for managing the sequential operations involved in surface design and manipulation. The data additions and edits are remembered as a list of atomic operations. The user can browse the surface's operation list and toggle steps on/off, or remove an operation. This provides the ability to play back the surface to a previous (original) state, or back to its current state. The user can compare the effects that individual operations may have on the surface by toggling them on/off in the surface operation list.

Edit Operations

As described above, a surface in a CAD/GIS application 108 may be edited/modified. In this regard, various surface edit operations may be conducted. Table 1 illustrates some of the various edit operations permitted by specific surface types.

TABLE 1

Edit Operations by Surface Type

| Property | TIN Surface | TIN Vol. Surface | Grid Surface | Grid Vol. Surface |
|---|---|---|---|---|
| Add point | Yes | Yes | Yes | Yes |
| Delete point | Yes | Yes | Yes | Yes |
| Modify point | Yes | Yes | Yes | Yes |
| Add line | Yes | Yes | No | No |
| Delete line | Yes | Yes | Yes | Yes |
| Swap edge | Yes | Yes | No | No |
| Minimize flat faces | Yes | Yes | No | No |
| Non-destructive breakline | Yes | Yes | No | No |
| Smooth surface | Yes | No | No | No |
| Paste surface | Yes | No | No | No |
| Raise/lower surface | Yes | No | Yes | No |
| Import LandXML | Yes | No | Yes | Yes |
| Import TIN | Yes | No | No | No |
| Import DEM | No | No | No | No |

The following description summarizes some of the commands/operations from the above table that are available to edit a surface. The Add Line command adds a new TIN line to an existing surface. Similarly, the Delete Line command, deletes TIN lines from a surface. The Swap Edge command changes the direction of two triangle faces in the surface model so that the triangle edges match ridges or swales, for example. The Add Point command adds points directly to the surface model and the Delete Point command deletes points from a surface to remove inaccurate or unnecessary data. The Modify Points command changes the elevations of single or multiple surface points. The Move Point command moves an existing surface point to a new location and then updates the surface triangulation.

The Non-destructive Breaklines command creates a non-destructive breakline from an open or closed polyline. The Minimize Flat Faces command checks each contour in the surface contour data for any triangles that have either three points on the same contour or three points at the same elevation. The Raise/Lower Surface command changes the surface elevations by adding or subtracting an amount from the existing elevation of all the surface points.

The Smooth Surface command displays a smooth surface dialog for smoothing a surface. The Paste Surface command pastes a selected surface, into the current surface.

Edit History

In the prior art, when a surface was built (triangulated), surface points were extracted from the source data, triangulated, and then an edit history was applied to the triangulation. However, the build process was always in this order. In other words, the adding/removing of data and the sequence of editing was never applied in the original creation order.

In accordance with one or more embodiments of the invention, the build process is incremental. When data is added or the surface is edited, the surface is updated; when data is removed, the surface is rebuilt.

A definition list provides a sequential list of all operations performed on the surface in its current state. One can edit the definition list by toggling on/off a definition item, or deleting the item from the list. When definition items are toggled off, the surface is updated, but the surface still has a reference to the definition item. If the definition item is removed from the list, the definition item data is permanently removed from the surface.

Figure 2:
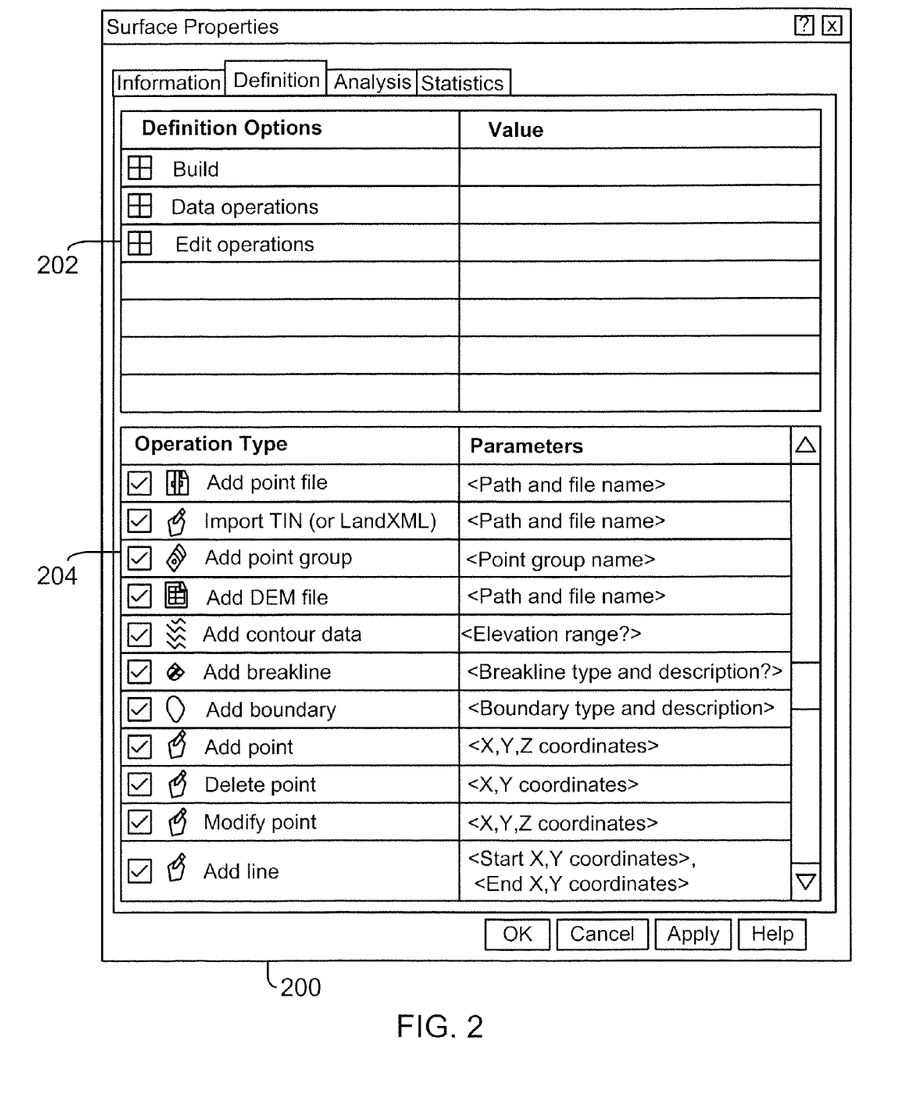
FIG. 2 illustrates a graphical user interface window presented to the user to define definition items in accordance with one or more embodiments of the invention.

To toggle on/off or remove surface definition terms, a graphical user interface window may be presented to the user. In the window, a surface definition may always be listed in the order the definition items were added when the surface was built/edited. FIG. 2 illustrates a graphical user interface window presented to the user to define definition items in accordance with one or more embodiments of the invention. There are two primary areas of the interface window 200—definition options section 202 and definition list section 204. Definitions options section 202 allows the user to define/specify options in various categories—build, data operations, and edit operations. As illustrated in FIG. 2, each of these categories are in a contracted mode as indicated by the "+" icon adjacent to each category listing in section 202. By selecting the "+" icon, each category may be expanded to provide further options.

Figure 3:
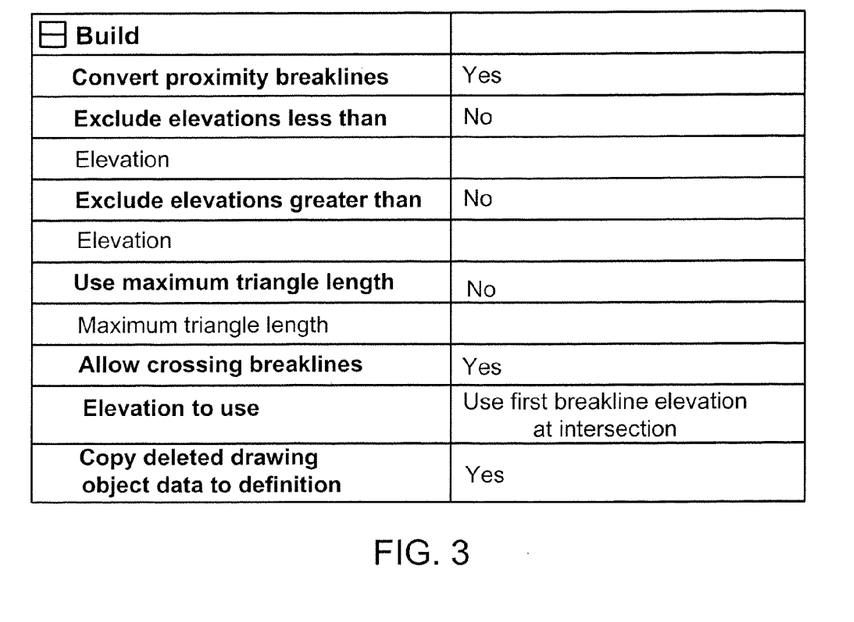
FIG. 3 illustrates an expanded build category section for defining options for definition items in accordance with one or more embodiments of the invention.

The build category allows the user to define/specify various property values that occur when building a surface. FIG. 3 illustrates an expanded build category section in accordance with one or more embodiments of the invention. As illustrated in FIG. 3, when building a TIN surface, the user may determine whether or not to convert proximity breaklines to standard breaklines. Further, the user may elect whether point elevations less than (or greater than) a specified value are excluded and whether surface triangles that exceed a specified length are removed from the boundary of the surface. In addition, the user can determine whether crossing breaklines are corrected when they occur. If a breakline touches an existing breakline, a user can specify what elevation to use at the calculated point of intersection. In this regard, the X, Y coordinate location may be calculated and the elevation determined based on a user selected option that may include using a first breakline elevation at the intersection, using a last breakline elevation at the intersection, or using the average or the first and last breakline elevation at the intersection.

A last build category user option may provide for whether the drawing object data is to be copied to the surface definition if the drawing object data is deleted. When a surface boundary, breakline, or point group is added to a surface, the surface definition may store an identification for the object (referred to as an Object ID). If the drawing object, such as the original Polyline used to define the surface boundary, is deleted from the drawing, the coordinates of the Polyline vertices will be copied into the surface definition and saved. Therefore the surface boundary definition is not lost from the surface definition. However, if the user opts not to copy the surface definition upon drawing object data deletion, the surface boundary, breakline, or point group definition will be removed from the surface definition when the surface is rebuilt. The reason this occurs is due to the fact that the Object ID of the defining drawing object no longer exists in the drawing database.

Figure 4:
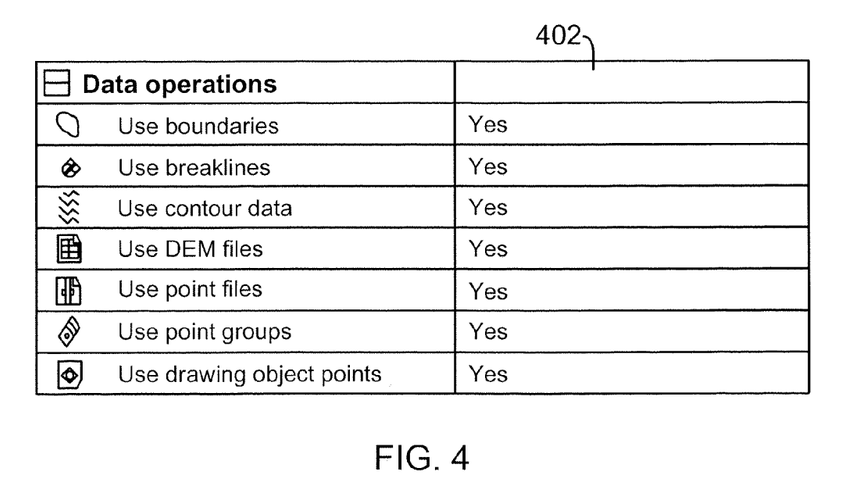
FIG. 4 illustrates an expanded Data Operations category window for defining options for definition items in accordance with one or more embodiments of the invention.

The Data Operations category in an expanded form is illustrated in FIG. 4. The Data Operations category is used for selecting and deselecting a surface data type in the definition list. If "Yes" is specified in the value column 402, all definition items of that type will be checked in the definition list. If "No" is specified in value column 402, all definition items of that type are unchecked in the definition list. If the definition list section 204 contains mixed checked and unchecked items of a specific type, a combo box (in the value column 402) displays "Varies". "Varies" cannot be selected from such a combo box; and may only be displayed when the mixed checked/unchecked condition exists of a specific data type in the definition list section 204.

Table 2 illustrates the various data operations options that are selectable by surface type in accordance with one or more embodiments of the invention.

TABLE 2

Data Operations Options by Surface Type

| Property | TIN Surface | TIN Vol. Surface | Grid Surface | Grid Vol. Surface |
| --- | --- | --- | --- | --- |
| Boundaries | Yes | Yes | Yes | Yes |
| Breaklines | Yes | No | No | No |
| Contour data | Yes | No | No | No |
| DEM files | Yes | No | Yes | No |
| Point files | Yes | No | No | No |
| Point groups | Yes | No | No | No |
| Drawing object points | Yes | No | No | No |

Figure 5:
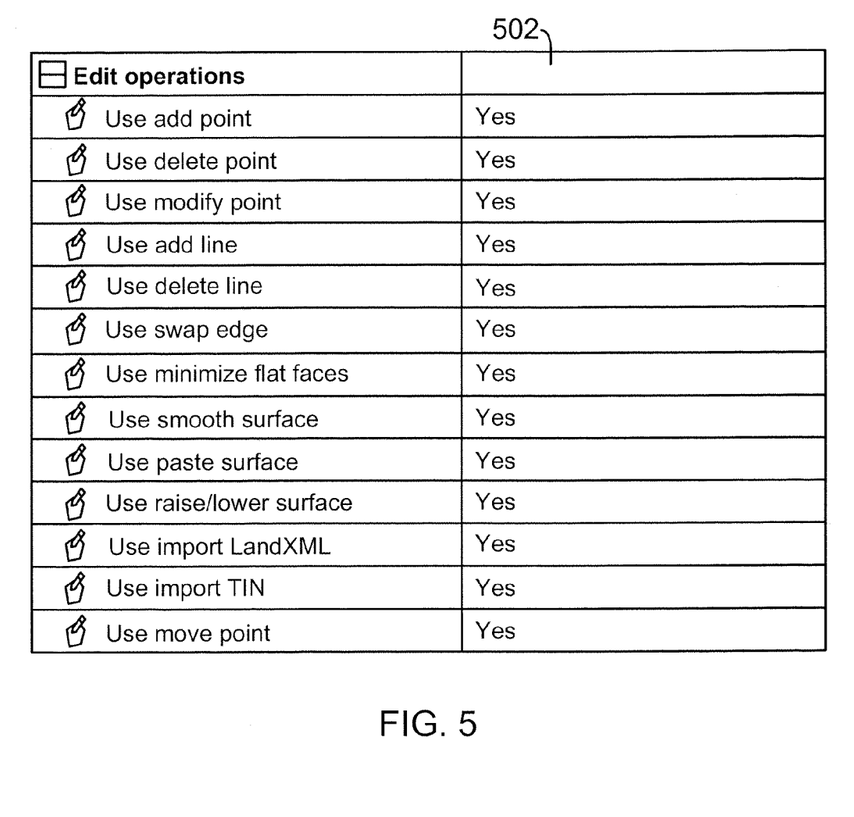
FIG. 5 illustrates an expanded Edit Operations category window for defining options for definition items in accordance with one or more embodiments of the invention.

The expanded Edit Operations category is displayed in FIG. 5 and is used for selecting and deselecting a surface operation type in the definition list. If "Yes" is specified in column 502, all definition items of that type will be checked in the definition list. If "No" is specified in column 502, all definition items of that type are unchecked in the definition list. If the definition list contains mixed checked and unchecked items of a specific type, a combo box in column 502 displays "Varies". "Varies" cannot be selected from a combo box in column 502; it is only displayed when the mixed checked/unchecked condition exists of a specific data type (as set forth in the definition list selection 204).

Figure 6:
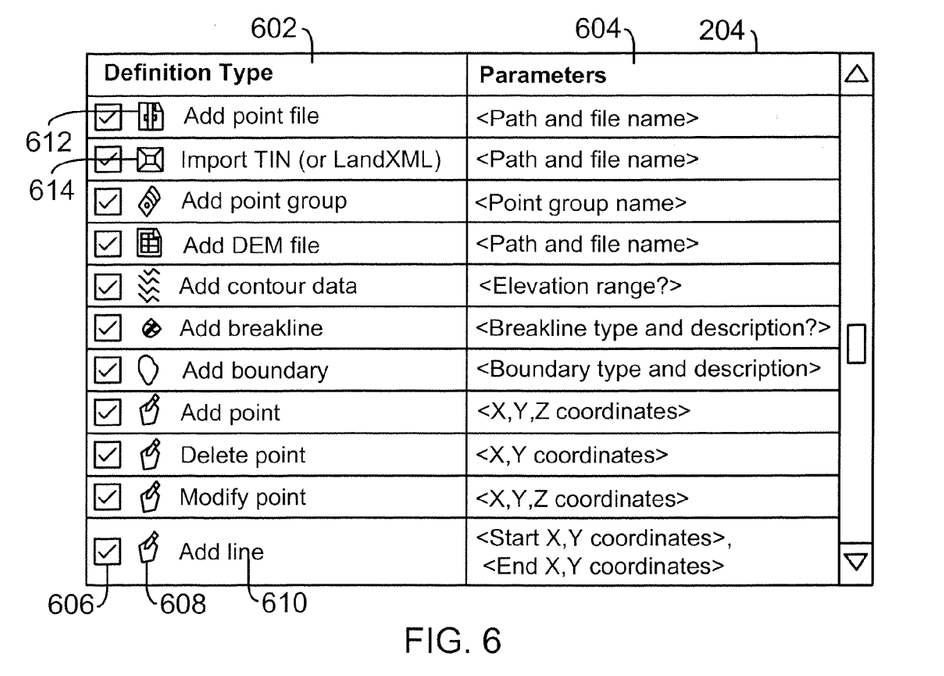
FIG. 6 illustrates an enlarged view of the definition list section for surface edit operations in accordance with one or more embodiments of the invention.

The Definition list section 204 provides the list of operations used to edit a surface in accordance with one or more embodiments of the invention. The items in the definition list may always be displayed in the order they were performed in. FIG. 6 illustrates an enlarged view of the definition list section 204 of FIG. 2 in accordance with one or more embodiments of the invention.

The Definition list view 204 contains two columns: Definition/operation Type 602 and Parameters 604. The Definition Type column 602 contains a check box 606, item type icon 608, and the definition type 610. The Parameters column 604 contains information about the item type, such as path and file name if the item is a file.

The checkbox 606 is used to determine whether the particular listed definition/operation type 610 (represented by icon 608) is to be included/used during the edit operation. Accordingly, the data additions/surface manipulations are all remembered as a list 204 of atomic operations. The user can browse the definition list section 204 and toggle particular steps/edit operations on/off, or remove an operation. In this regard, the user can play back the surface to a previous (original) state, or back to its current state. Further, the user can compare the effects that individual operations may have on the surface by toggling them on/off in the definition list 204.

Also, the user can toggle groups of operations on/off based on the options specified in definition options section 202.

Table 3 illustrates the items that may appear in the Definition list view 204 when added to a surface definition.

TABLE 3

Surface Definition List

| Operation Type | Operation Parameter |
| --- | --- |
| ☑ Add point group | <Point group name> |
| ☑ Add point file | <Path and file name> |
| ☑ Add breakline[s] | <Type and description> |
| ☑ Add contour data | <Elevation range> |
| ☑ Add boundary | <Type and description |
| ☑ Add DEM file | <Path and file name> |
| ☑ Add point | <X,Y,Z coordinates> |
| ☑ Delete point | <X,Y coordinates> |
| ☑ Modified point | <X,Y,Z coordinates> |
| ☑ Add line | <Start X,Y coordinates>, <End X,Y coordinates> |
| ☑ Delete line | <Start X,Y coordinates>, <End X,Y coordinates> |
| ☑ Swap edge | <Start X,Y coordinates>, <End X,Y coordinates> |
| ☑ Add Non-destructive breakline | <Description> |
| ☑ Minimize flat faces | <Number of faces removed> |
| ☑ Raise/Lower surface (points) | <Difference elevation> |
| ☑ Smooth surface | <Type an number of points> |
| ☑ Paste surface | <Surface name> |
| ☑ Import TIN | <Path and file name> |
| ☑ Import XML | <Path and file name> |

As described above, when the definition type check box 606 is checked, the definition item's data is in use within the surface definition. For example, when a point file is unchecked from the list, the surface points that originated from the point file are hidden and the surface triangulation is updated when the OK/Apply button is selected.

To permanently remove selected definition items (also removes its data from the surface definition), a "Remove From Definition" option may be selected from a definition item context menu. Such a definition item context menu may be displayed by positioning the cursor over a particular definition item and clicking the right mouse button. Alternatively, any other method for selecting a particular item may be used in accordance with one or more embodiments of the invention. Once removed, the selected definition may be permanently removed from the surface and cannot be toggled/selected from the definition list 204.

The icons 608 displayed in the definition list 204 may indicate or provide information about the particular item. For example, a particular "item modified" icon 612 may be displayed if a definition item has been modified after being added to the surface. Similarly, an "item not found" icon 614 may be displayed if a definition item cannot be found when a surface properties dialog has been initialized.

If a definition item in the list 204 has been checked, unchecked or removed, or if a definition item is displayed as Modified 612 or Not Found 614, the user may be informed via a dialog box (e.g., that the surface is out of date) and presented with the option to rebuild the surface and apply changes made, apply changes made to surface properties, except for definitions, or merely returning to another dialog, for example.

In view of the above, the definition list 204 presents a list of atomic surface edit operations that the user may elect to enable/disable on an individual/group basis.

Logical Flow

Figure 7:
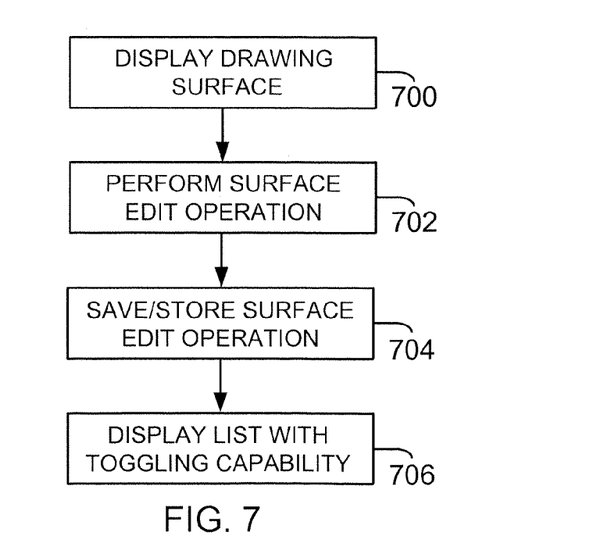
FIG. 7 is a flow chart illustrating the logical flow for providing a surface construction audit trail and manipulation in accordance with one or more embodiments of the invention.

FIG. 7 is a flow chart illustrating the logical flow for providing a surface construction audit trail and manipulation in accordance with one or more embodiments of the invention. At step 700, a drawing surface is displayed in a CAD/GIS application. At step 702, a surface edit operation is performed on the drawing surface. A step 704, the surface edit operation is stored/saved (e.g., on disk, in a database, in random access memory, etc.) as an atomic property in a list of surface edit operations.

At step 706, the list of surface edit operations (referred to above as the definition list) is displayed in a graphical user interface (GUI). Each surface edit operation may be independently toggled on/off in the GUI (e.g., by selecting/deselecting a checkbox). Alternatively, the user may toggle surface edit operations by group/category. In this regard, edit operations of a particular surface data type or category may be toggled on/off as a group.

The toggling is reflected in the CAD/GIS application in the drawing by displaying an effect of executing the surface edit operation (if toggled on) and displaying the drawing surface without execution of the surface edit operation (if toggled off). The toggling is reflected in the drawing automatically and dynamically by the CAD/GIS application updating the drawing surface. Further, the list may also include a graphical icon adjacent to each surface edit operation that identifies a status of the surface edit operation (e.g., that the edit operation has been modified or a definition for the edit operation cannot be found).

The list in the GUI is sorted sequentially in an order in which each surface edit operation is performed. Alternatively, the user may opt to sort the list in an alternative order (e.g., by type of edit operation, reverse performance order, etc.).

In addition to the above, the user may opt to remove the surface edit operation from the list of surface edit operations. Such a removal may cause the surface edit operation to be permanently removed from the drawing surface and/or stored list of edit operations. Alternatively, if the user merely toggles off the surface edit operation, the drawing surface maintains a reference to the surface edit operation.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to manipulate a drawing surface and manage such manipulations/edits as atomic operations. Users may elect to use/not use a particular edit operation that has been performed merely by independently (or on a group basis) toggling particular edit operations. Accordingly, the effect of individual operations on a surface may be compared to other operations. Similarly, the user does not need to undo or elect not to use all edit operations up to the latest edit operation. Instead, the user can toggle on/off an edit operation earlier in a chain independently from toggling an edit operation later in the chain of edit operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and equivalents thereof.

What is claimed is:

1. A method for manipulating a drawing surface in a CAD/GIS computer application, comprising:
    displaying a triangulated irregular network (TIN) drawing surface in a CAD/GIS application;
    performing a surface edit operation on the TIN drawing surface, wherein the surface edit operation modifies a property of the TIN drawing surface;
    persistently storing, in persistent storage, the surface edit operation as an atomic property in a list of surface edit operations;
    persistently storing, in persistent storage, the list of surface edit operations; and
    displaying the list of surface edit operations in a graphical user interface, wherein each surface edit operation may be independently toggled on/off in the graphical user interface and such toggling is reflected in the CAD/GIS application by displaying an effect of executing the surface edit operation if toggled on and displaying the TIN drawing surface without execution of the surface edit operation if toggled off, and wherein the surface edit operation is displayed in the list and maintained in persistent storage both when the surface edit operation is toggled on and when the surface edit operation is toggled off.

2. The method of claim 1, wherein the toggling is reflected in the CAD/GIS application by dynamically and automatically updating the drawing surface.

3. The method of claim 1, wherein the list of surface edit operations are sorted sequentially in an order in which each surface edit operation is performed.

4. The method of claim 1, further comprising removing the surface edit operation from the list of surface edit operations wherein such removal causes the surface edit operation to be permanently removed from the drawing surface.

5. The method of claim 1, wherein if the surface edit operation is toggled off, the drawing surface maintains a reference to the surface edit operation.

6. The method of claim 1, wherein a surface edit operations in the list may be toggled on/off by group by surface data type.

7. The method of claim 1, wherein a graphical icon adjacent to a surface edit operation in the list identifies a status of the surface edit operation.

8. The method of claim 1, wherein the persistent storage comprises a hard disk.

9. The method of claim 1, further comprising toggling multiple different surface edit operations on/off independently from each other while remaining simultaneously displayed in the list of surface edit operations.

10. An apparatus for manipulating a drawing surface in a CAD/GIS computer application comprising:
    (a) a computer system having a memory and a persistent data storage device coupled thereto; and
    (b) a GIS/CAD application executing on the computer, wherein the application is configured to:
        (i) display a triangulated irregular network (TIN) drawing surface in a CAD/GIS application;
        (ii) perform a surface edit operation on the TIN drawing surface, wherein the surface edit operation modifies a property of the TIN drawing surface;
        (iii) persistently store, in the persistent data storage device, the surface edit operation as an atomic property in a list of surface edit operations;

(iv) persistently store, in the persistent data storage device, the list of surface edit operations; and (iv) display the list of surface edit operations in a graphical user interface, wherein each surface edit operation may be independently toggled on/off in the graphical user interface and such toggling is reflected in the CAD/GIS application by displaying an effect of executing the surface edit operation if toggled on and displaying the TIN drawing surface without execution of the surface edit operation if toggled off and wherein the surface edit operation is displayed in the list and maintained in the persistent data storage device both when the surface edit operation is toggled on and when the surface edit operation is toggled off.

11. The apparatus of claim 10, wherein application is configured to reflect the toggling by dynamically and automatically updating the drawing surface.

12. The apparatus of claim 10, wherein the list of surface edit operations are sorted sequentially in an order in which each surface edit operation is performed.

13. The apparatus of claim 10, wherein the application is further configured to remove the surface edit operation from the list of surface edit operations wherein such removal causes the surface edit operation to be permanently removed from the drawing surface.

14. The apparatus of claim 10, wherein if the surface edit operation is toggled off, the drawing surface maintains a reference to the surface edit operation.

15. The apparatus of claim 10, wherein a surface edit operations in the list may be toggled on/off by group by surface data type.

16. The apparatus of claim 10, wherein a graphical icon adjacent to a surface edit operation in the list identifies a status of the surface edit operation.

17. An article of manufacture comprising a program storage medium readable by a computer and embodying one or more instructions executable by the computer to perform a method for manipulating a drawing surface in an GIS/CAD computer system, the method comprising:

displaying a triangulated irregular network (TIN) drawing surface in a CAD/GIS application;

performing a surface edit operation on the TIN drawing surface, wherein the surface edit operation modifies a property of the TIN drawing surface;

persistently storing, in persistent storage, the surface edit operation as an atomic property in a list of surface edit operations;

persistently storing, in persistent storage, the list of surface edit operations: and displaying the list of surface edit operations in a graphical user interface, wherein each surface edit operation may be independently toggled on/off in the graphical user interface and such toggling is reflected in the CAD/GIS application by displaying an effect of executing the surface edit operation if toggled on and displaying the TIN drawing surface without execution of the surface edit operation if toggled off, and wherein the surface edit operation is displayed in the list and maintained in persistent storage both when the surface edit operation is toggled on and when the surface edit operation is toggled off.

18. The article of manufacture of 17, wherein the toggling is reflected in the CAD/GIS application by dynamically and automatically updating the drawing surface.

19. The article of manufacture of claim 17, wherein the list of surface edit operations are sorted sequentially in an order in which each surface edit operation is performed.

20. The article of manufacture of claim 17, wherein the method further comprises removing the surface edit operation from the list of surface edit operations wherein such removal causes the surface edit operation to be permanently removed from the drawing surface.

21. The article of manufacture of claim 17, wherein if the surface edit operation is toggled off, the drawing surface maintains a reference to the surface edit operation.

22. The article of manufacture of claim 17, wherein a surface edit operations in the list may be toggled on/off by group by surface data type.

23. The article of manufacture of claim 17, wherein a graphical icon adjacent to a surface edit operation in the list identifies a status of the surface edit operation.

* * * * *